(12) United States Patent
Liao et al.

(10) Patent No.: US 12,032,261 B2
(45) Date of Patent: Jul. 9, 2024

(54) PRIVACY FILMS FOR ELECTRONIC DISPLAYS

(71) Applicant: Hewlett-Packard Development Company, L.P., Spring, TX (US)

(72) Inventors: Super Liao, Taipei (TW); Hsing-Hung Hsieh, Taipei (TW); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 601 days.

(21) Appl. No.: 17/046,035

(22) PCT Filed: Sep. 12, 2018

(86) PCT No.: PCT/US2018/050585
§ 371 (c)(1),
(2) Date: Oct. 8, 2020

(87) PCT Pub. No.: WO2020/055390
PCT Pub. Date: Mar. 19, 2020

(65) Prior Publication Data
US 2021/0191223 A1    Jun. 24, 2021

(51) Int. Cl.
*G02F 1/167*      (2019.01)
*G02F 1/13357*    (2006.01)
(Continued)

(52) U.S. Cl.
CPC ............ *G02F 1/167* (2013.01); *G02F 1/1677* (2019.01); *G09G 3/344* (2013.01); *G02F 1/133606* (2013.01)

(58) Field of Classification Search
CPC .. G02F 1/167; G02F 1/1677; G02F 1/133606; G09G 3/344
(Continued)

(56) References Cited

U.S. PATENT DOCUMENTS

| 7,327,511 B2 | 2/2008 | Whitesides et al. |
| 7,492,497 B2 | 2/2009 | Paolini, Jr. et al. |

(Continued)

FOREIGN PATENT DOCUMENTS

| CN | 108375858 A | 8/2018 |
| GB | 2499634 A | 8/2013 |
| JP | 2007-240903 A | 9/2007 |

*Primary Examiner* — Sharrief I Broome
(74) *Attorney, Agent, or Firm* — Shook, Hardy & Bacon L.L.P.; Elena McFarland

(57) ABSTRACT

The present disclosure is drawn to privacy films for electronic displays. In one example, a privacy film for an electronic display can include a louver film. The louver film can include: a plurality of high refractive index slats with a refractive index of about 1.5 to about 3 and having a trapezoidal cross section narrowing toward a viewer side of the louver film; and a plurality of low refractive index slats between the high refractive index slats, having a refractive index less than the refractive index of the high refractive index slats by about 0.1 to about 2. An electrophoretic ink can be optically associated with the low refractive index slats, including opaque particles that are electrically mobile to cause modification of light transmission therethrough. A first and second transparent electrode film can be on a viewer side and a rear side of the electrophoretic ink, respectively.

18 Claims, 11 Drawing Sheets

(51) Int. Cl.
*G02F 1/1677* (2019.01)
*G09G 3/34* (2006.01)

(58) Field of Classification Search
USPC .................. 359/296, 289, 297, 298, 295
See application file for complete search history.

(56) References Cited

U.S. PATENT DOCUMENTS

| | | |
|---|---|---|
| 8,441,414 B2 | 5/2013 | Lin |
| 8,686,407 B2 | 4/2014 | Shu et al. |
| 9,025,234 B2 | 5/2015 | Lin |
| 9,664,978 B2 | 5/2017 | Arango et al. |
| 2005/0174529 A1* | 8/2005 | Fukushima ............ G02F 1/1323 |
| | | 349/197 |
| 2008/0130092 A1 | 6/2008 | Whitesides et al. |
| 2010/0141573 A1* | 6/2010 | Lin ........................ G02B 5/045 |
| | | 362/351 |
| 2010/0271407 A1* | 10/2010 | Ho ........................ G09G 3/344 |
| | | 345/107 |
| 2014/0232960 A1 | 8/2014 | Schwartz et al. |
| 2015/0138059 A1 | 5/2015 | Large et al. |
| 2016/0011441 A1 | 1/2016 | Schwartz et al. |
| 2016/0280934 A1* | 9/2016 | Inoue ...................... G02F 1/167 |
| 2017/0010516 A1 | 1/2017 | Shiota |
| 2017/0045764 A1 | 2/2017 | Gere |
| 2017/0097555 A1 | 4/2017 | Lattes et al. |
| 2018/0120580 A1* | 5/2018 | Ouderkirk ............. H01L 31/054 |
| 2020/0209702 A1 | 7/2020 | Qu et al. |

\* cited by examiner

PRIVACY FILMS FOR ELECTRONIC DISPLAYS

BACKGROUND

The use of personal electronic devices, computing devices, or any other type of device that uses an optical display continues to increase. Televisions, desktop computers, laptops, tablets, smartphones, and the like, with optical display screens have become more and more common. Portable laptop computers continue to be used by many for personal, entertainment, and business purposes. Mobile devices, including laptops, tablets, and smartphones are often used to access and view sensitive information. This information can include personal information, passwords, banking information, confidential business documents, and so on. As these types of information continue to be accessed and viewed using mobile devices, sometimes in public settings, privacy can often be a concern.

DETAILED DESCRIPTION

Figure 1:
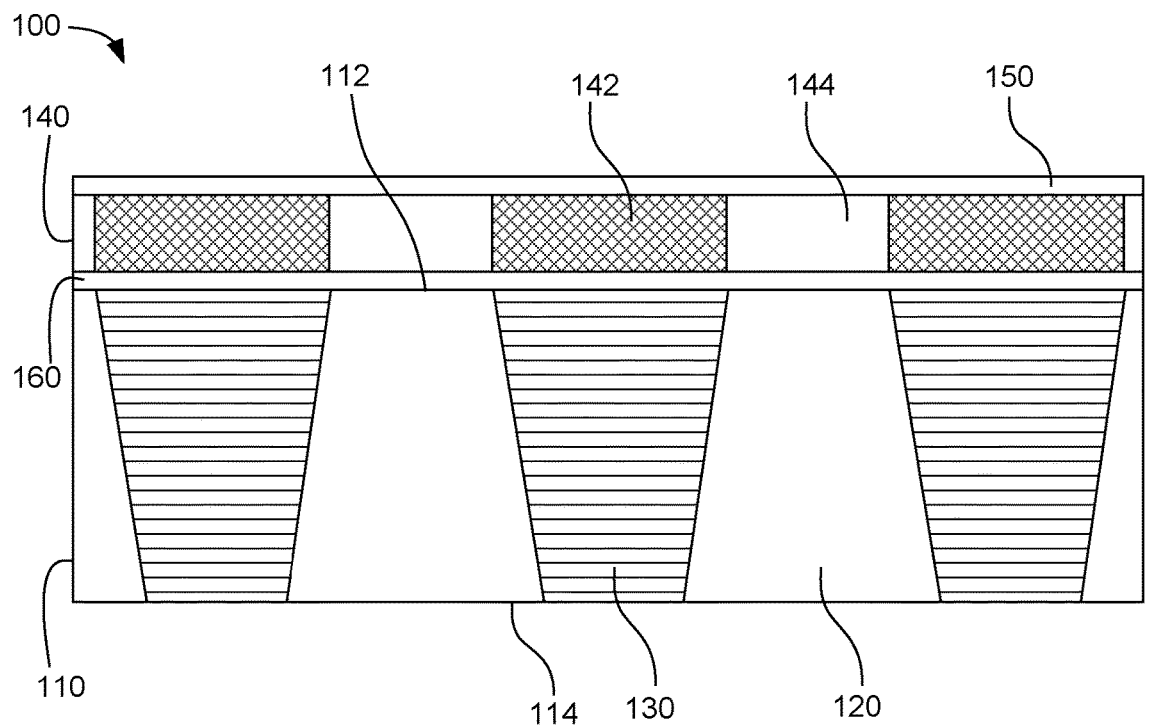
FIG. 1 is a schematic cross-sectional view illustrating an example privacy film in accordance with examples of the present disclosure.

The present disclosure describes privacy films for electronic displays. In one example, a privacy film for an electronic display can include a louver film. The louver film can include a plurality of high refractive index slats having a trapezoidal cross section narrowing toward a viewer side of the louver film. The high refractive index slats can have a refractive index of about 1.5 to about 3. The louver film can also include a plurality of low refractive index slats between the high refractive index slats. The low refractive index slats have a refractive index less than the refractive index of the high refractive index slats by about 0.1 to about 2. An electrophoretic ink can be optically associated with the low refractive index slats. The electrophoretic ink can include opaque particles that are electrically mobile. Movement of the opaque particles can cause modification of light transmission through the electrophoretic ink. A first transparent electrode film can be on a viewer side of the electrophoretic ink, and a second transparent electrode film can be on a rear side of the electrophoretic ink. In further examples, the opaque particles in the electrophoretic ink can move to permit light transmitted from the low refractive index slats when a voltage is applied or modified across the first transparent electrode film and the second transparent electrode film. In certain examples, the electrophoretic ink can be positioned within the low refractive index slats. In other examples, the electrophoretic ink can be positioned as a separate layer on the viewer side of the low refractive index slats. In some examples, the opaque particles can include a black pigment. In further examples, the electrophoretic ink can also include transparent particles. In some cases, the transparent particles and opaque particles can be oppositely charged, and the transparent particles and the opaque particles can rearrange with respect to one another when a voltage is applied or modified. In some examples, the cross section of the high refractive index slats can have an acute angle from about 85° to about 88°. In further examples, the high refractive index slats can include polyethylene terephthalate, polyethylene, polycarbonate, poly (acrylic acid), or combinations thereof. In still further examples, the privacy film can also include a power supply connected to the first transparent electrode film and the second transparent electrode film through a switch.

The present disclosure also extends to electronic displays with privacy films. In one example, an electronic display can include a backlight unit, a liquid crystal display panel on a viewer side of the backlight unit, and a privacy film on a viewer side of the liquid crystal display panel. The privacy film can include a louver film. The louver film can include a plurality of high refractive index slats having a trapezoidal cross section narrowing toward a viewer side of the louver film. The high refractive index slats can have a refractive index of about 1.5 to about 3. The louver film can also include a plurality of low refractive index slats between the high refractive index slats. The low refractive index slats can have a refractive index less than the refractive index of the high refractive index slats by about 0.1 to about 2. The louver film can also include an electrophoretic ink optically associated with the low refractive index slats. The electrophoretic ink can include opaque particles that are electrically mobile, and movement of the opaque particles can cause modification of light transmission through the electrophoretic ink. The privacy film can also include a first electrode film on a viewer side of the electrophoretic ink, and a second transparent film on a rear side of the electrophoretic ink. In certain examples, the privacy film can be oriented such that the high refractive index slats and low refractive index slats extend in a vertical direction with respect to a viewer. In other examples, the electronic display can be a part of an electronic device and the electronic device can include a connection to the first transparent electrode film and the second transparent electrode film to apply or modify a voltage across the first transparent electrode film and the second transparent electrode film.

The present disclosure also extends to methods of making privacy films. In one example, a method of making a privacy film for an electronic display can include forming a louver film by placing a plurality of high refractive index slats having a trapezoidal cross section narrowing toward a viewer side of the louver film. The high refractive index slats can have a refractive index of about 1.5 to about 3. The forming of the louver film can also include placing a plurality of low refractive index slats between the high refractive index slats. The low refractive index slats can have a refractive index less than the refractive index of the high refractive index slats by about 0.1 to about 2. An electrophoretic ink can be optically associated with the low refractive index slats. The electrophoretic ink can include opaque particles that are electrically mobile. Movement of the opaque particles can cause modification of light transmission through the electrophoretic ink. The method can also include placing a first transparent electrode film on a viewer side of the electrophoretic ink and a second electrode film on a rear side of the electrophoretic ink. In some examples, optically associating the electrophoretic ink can include placing the electrophoretic ink within the low refractive index slats or in a separate layer on the viewer side of the low refractive index slats.

Privacy Films for Electronic Displays

The privacy films described herein can provide an easy way to increase the privacy of any electronic display, while being easily switchable from privacy mode to sharing mode. As used herein, "privacy mode" refers to a state of the privacy film in which the viewable angle of the electronic display to which the privacy is attached is restricted to a particular angle. In contrast, "sharing mode" refers to another state of the privacy film in which the viewable angle is greater than the restricted viewing angle in privacy mode.

In certain existing privacy technologies, a single-state privacy film may be attached to an electronic display. These single-state privacy films can restrict the viewable angle of the electronic displays when attached, but the films are not switchable between a privacy mode and a sharing mode. Thus, if a user wishes to restrict the viewable angle for a period of time and then go back to an unrestricted viewing angle, the user can attach a privacy film and then remove the privacy film. However, repeatedly attaching and removing the privacy film can be inconvenient and time consuming. Other privacy technologies can provide an electronic display that is switchable between privacy mode and sharing mode. Such displays often include two separate backlight units so that one backlight unit can be used for privacy mode and the other backlight unit can be used for sharing mode. In alternative technologies, a specialized switching cell can be included in the electronic display. The additional backlight unit or switching cell built in to these displays increases the cost and complexity of the displays.

Unlike these existing technologies, the privacy films described herein can be made as a standalone film that can be applied to any electronic display. Therefore, in some examples the cost and complexity of the display is not increased by building in the privacy components. In other examples, the privacy film can be built in to an electronic display. However, the privacy film can still be thinner and less complex than some existing switching cells. The privacy films described herein can also work with un-collimated backlight units, which simplifies the electronic display compared to other technologies that use a collimated backlight unit. The privacy films described herein can also be switched from privacy mode to sharing mode at the press of a button or switch, which is more convenient than removing and re-attaching the privacy film to the electronic display.

The privacy films described herein can also be extremely energy efficient, consuming a small amount of power to switch between privacy mode and sharing mode. The privacy films can include electrophoretic ink ("e-ink") that can switch between a light blocking opaque state and a light transmitting state. The privacy films can also include a louver film designed to direct wide angle light rays at the electrophoretic ink. The electrophoretic ink can block the wide angle rays when in the opaque state and transmit the rays when in the transmitting state. As is typical with electrophoretic ink displays, the privacy film uses energy when switching between the two states of the electrophoretic ink but not when remaining in a single state. The electrophoretic ink can remain in either state for long periods of time without any application of energy.

With this description in mind, FIG. 1 is a schematic cross-sectional view of an example privacy film 100 in accordance with the present disclosure. The privacy film includes a louver film 110 made up of high refractive index slats 120 and low refractive index slats 130. The louver film has a viewer side 112 and a rear side 114. The high refractive index slats have a trapezoidal cross section that narrows toward the viewer side of the louver film. The low refractive index slats occupy the space between the high refractive index slats. Thus, the low refractive index slats have a trapezoidal cross section that narrows toward the rear side of the louver film. The high refractive index slats can be made of a material having a refractive index from about 1.5 to about 3.0, and the low refractive index slats can have a refractive index that is from about 0.1 to about 2 less than the refractive index of the high refractive index slats. This example also includes an electrophoretic ink layer 140 on the viewer side of the louver film. The electrophoretic ink layer includes electrophoretic ink cells 142 and transparent cells 144. The electrophoretic ink cells are positioned over the low refractive index slats of the louver film. The electrophoretic ink cells contain an electrophoretic ink with opaque particles that are electrically mobile. The electrophoretic ink cells can switch from being opaque to being transparent depending on the voltage applied to the electronic ink cells. Voltage can be applied through a first transparent electrode film 150 on the viewer side of the electrophoretic ink layer and a second transparent electrode film 160 on the rear side of the electrophoretic ink layer.

Figure 2:
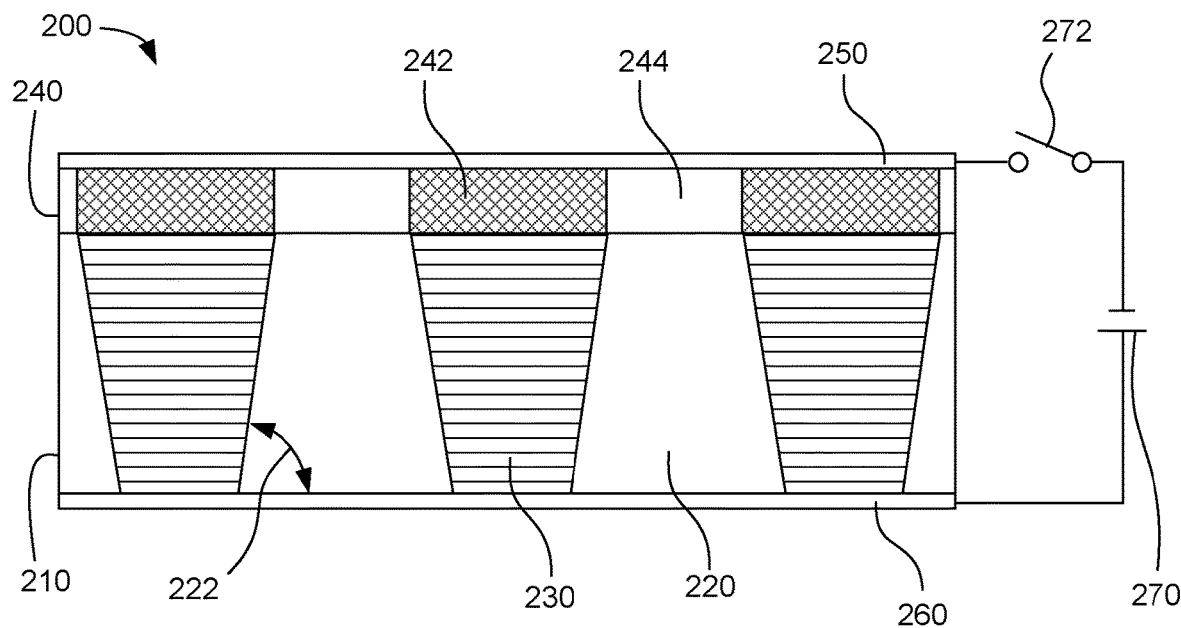
FIG. 2 is a schematic cross-sectional view illustrating another example privacy film in accordance with examples of the present disclosure.

FIG. 2 shows a different example privacy film 200 in accordance with the present disclosure, including a similar louver film 210 and electrophoretic ink layer 240. The louver film is made up of high refractive index slats 220 and low refractive index slats 230. The electrophoretic ink layer is made up of electrophoretic ink cells 242 and transparent cells 244. In this example, a first transparent electrode film 250 is on the viewer side of the electrophoretic ink layer as in the previous example. However, in this example, a second transparent electrode film 260 is on a rear side of the louver film instead of between the louver film and the electrophoretic ink layer. The first and second electrodes can still create an electric field sufficient to switch the electrophoretic ink from being opaque to being transparent. This figure also shows an acute angle 222 of the trapezoidal cross section of the high refractive index slats. In some examples, this angle can be from about 85° to about 88°. This example also includes a power supply 270 connected to the first transparent electrode film and the second transparent electrode film through a switch 272.

In various examples, the louver film can have geometry designed to work together with the electrophoretic ink to control the viewable angle of an electronic display to which the privacy film is applied. The trapezoidal shape of the slats and the refractive and reflective properties of the slats can direct narrow angle light through transparent portions of the privacy film while wide angle light can be directed toward the electrophoretic ink. Thus, when the electrophoretic ink is switched to an opaque state, the wide angle light can be blocked by the electrophoretic ink while the narrow angle light is transmitted through the privacy film. In this way the privacy film can limit the viewable angle to a narrow angle when the electrophoretic ink is in the opaque state.

Figure 3A:
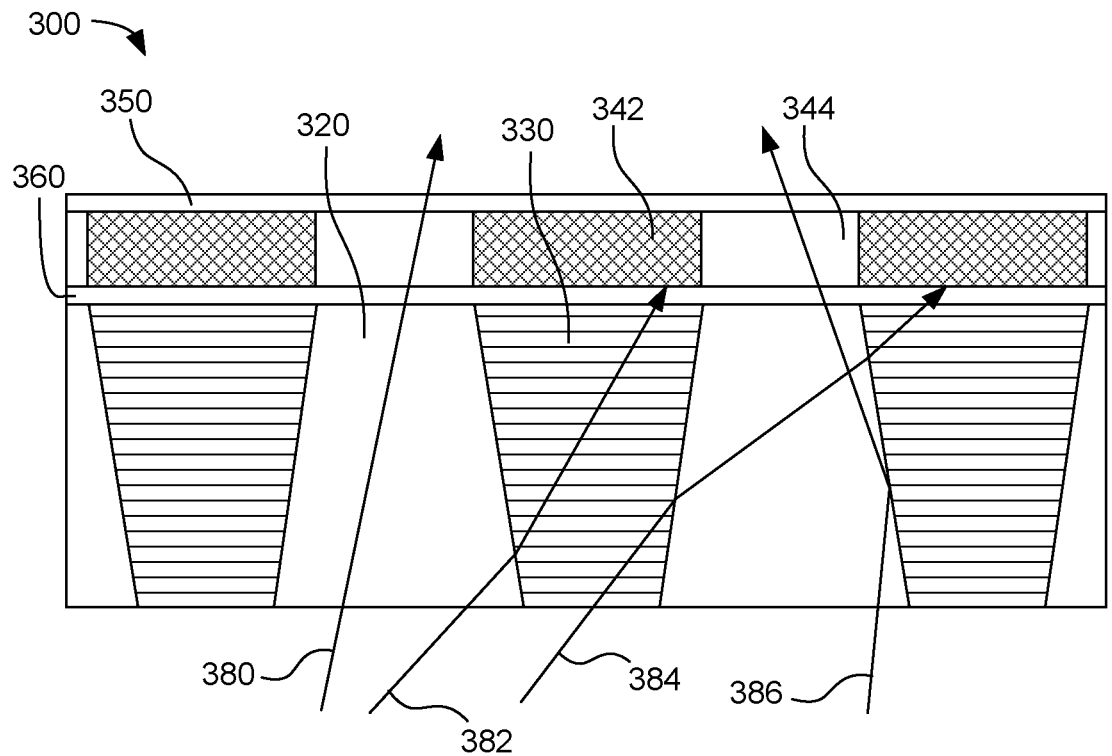
FIGS. 3A-3B are schematic cross-sectional views illustrating another example privacy film in accordance with examples of the present disclosure.
Figure 3B:
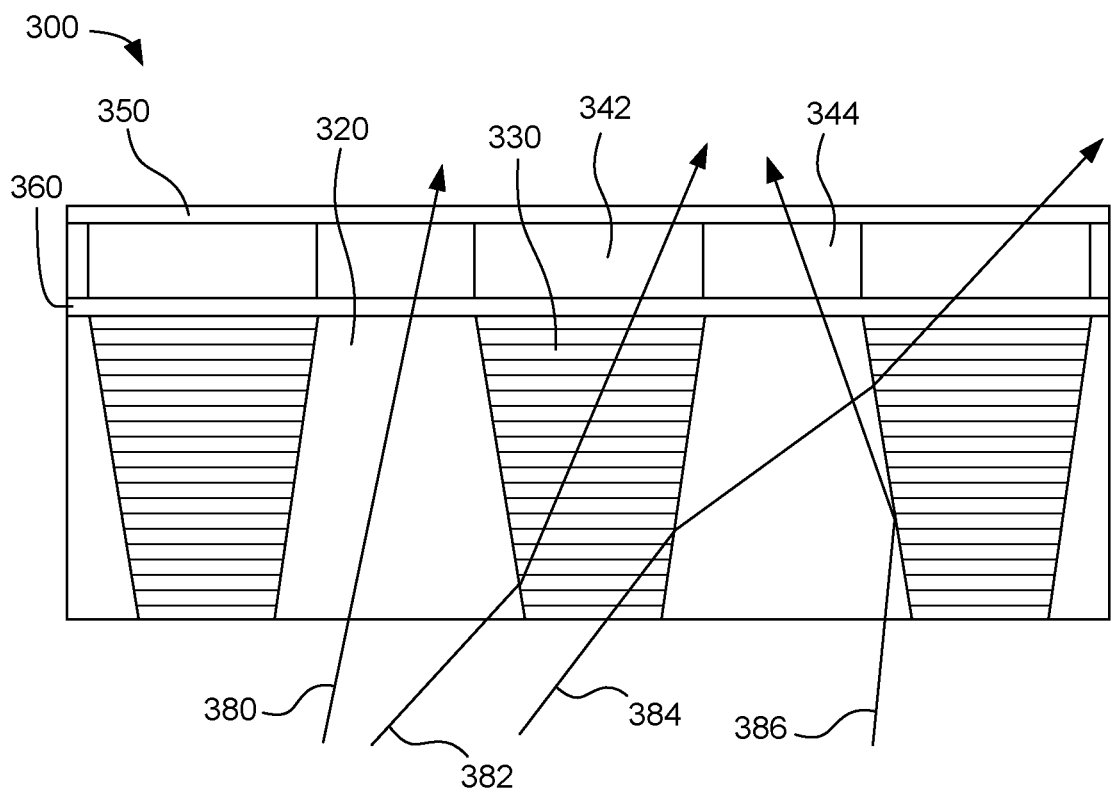

FIGS. 3A and 3B illustrate an example of how a privacy film 300 can switch between a narrow viewable angle privacy mode and a wide viewable angle sharing mode. In FIG. 3A, a first narrow angle light ray 380 is shown passing through a high refractive index slat 320. The light ray passes through the high refractive index slat, second transparent electrode film 360, transparent cell 344, and first transparent electrode film 350. Thus, light rays having a sufficiently narrow angle to pass all the way through the high refractive index slat and the transparent cell are transmitted through the privacy film to be observed by a viewer. A second light ray 382 with a wider angle enters the high refractive index slat. The light ray then crosses the interface between the high refractive index slat and a low refractive index slat 330. Due to the difference in refractive indices, the light ray bends to have a smaller angle relative to the angle of incidence on the interface between the slats. The light ray eventually strikes the electrophoretic ink cell 342. In this figure, the electrophoretic ink is in an opaque state, so the light ray is blocked by the opaque electrophoretic ink. A third light ray 384 having a wide angle travels through the low refractive index slat, then refracts at the interface with another high refractive index slat to have an even wider angle. The light ray then passes across the high refractive index slat and into another low refractive index, where it finally is blocked by an electrophoretic ink cell. A fourth light ray 386 is shown passing into a high refractive index slat and meeting the interface between the high refractive index slat and a low refractive index slat. The angle of incidence of this light ray is small enough that the light ray is reflected off the interface, and the light ray passes through the transparent electrode films and a transparent cell and is transmitted out of the privacy film.

FIG. 3B shows the privacy film 300 with the electrophoretic ink cells 342 in a transparent state. In this example, the light rays 380, 382, 384, and 386 are all transmitting through the privacy film because none of the light rays are blocked by the electrophoretic ink. As shown in this figure, the privacy film can transmit light at wide angles when the electrophoretic ink cells are in the transparent state. When the electrophoretic ink cells are opaque, as shown in FIG. 3A, the overall effect of the privacy is to block more wide angle light and transmit more narrow angle light.

Figure 4A:
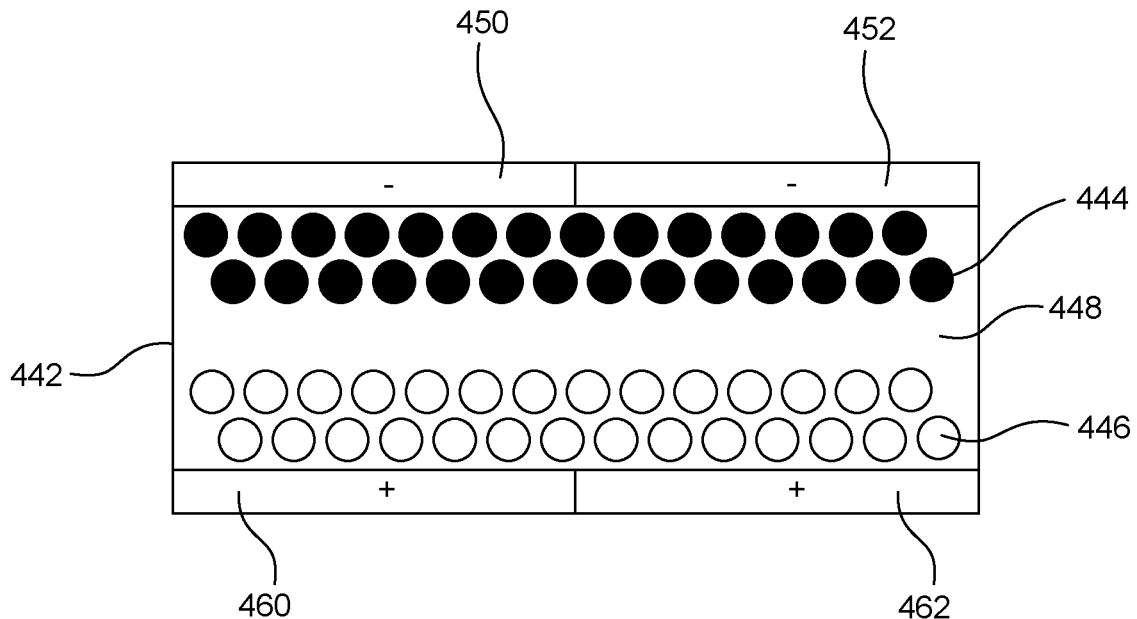
FIGS. 4A-4B are schematic cross-sectional views illustrating an example electrophoretic ink cell of a privacy film in accordance with examples of the present disclosure.
Figure 4B:
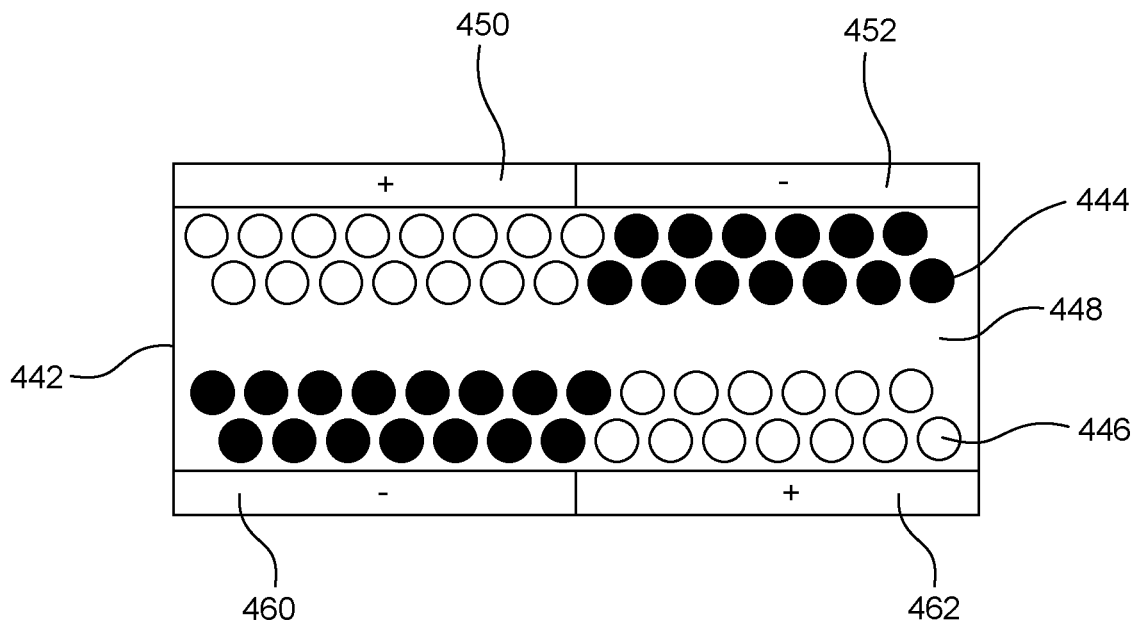

FIGS. 4A and 4B show a cross sectional schematic view of a single example electrophoretic ink cell 442 to show how the electrophoretic ink cell can switch from opaque to transparent. In this example, the electrophoretic ink includes opaque particles 444 and transparent particles 446 in a solvent 448. In this example, the opaque particles are positively charged and the transparent particles are negatively charged. The transparent electrode films in this example are split into multiple transparent electrodes 450, 452, 460, and 462. FIG. 4A shows that when electrodes 450 and 452 are negatively charged, the opaque particles are attracted to the negatively charged electrodes. Electrodes 460 and 462 are positively charged to attract the negatively charged transparent particles. In this state, the continuous layer of opaque particles next to electrodes 450 and 452 can block light from being transmitted through the electrophoretic ink cell.

In FIG. 4B, electrode 450 switches to positive charge and electrode 460 switches to negative charge. This can cause about half of the opaque particles to move toward electrode 460 and about half of the transparent particles to move toward electrode 450. In this state, some light is still blocked by the opaque particles. However, some light can pass through the transparent particles and be transmitted through the electrophoretic ink cell. Thus, the electrophoretic ink cell becomes transparent to a portion of the light.

Figure 5A:
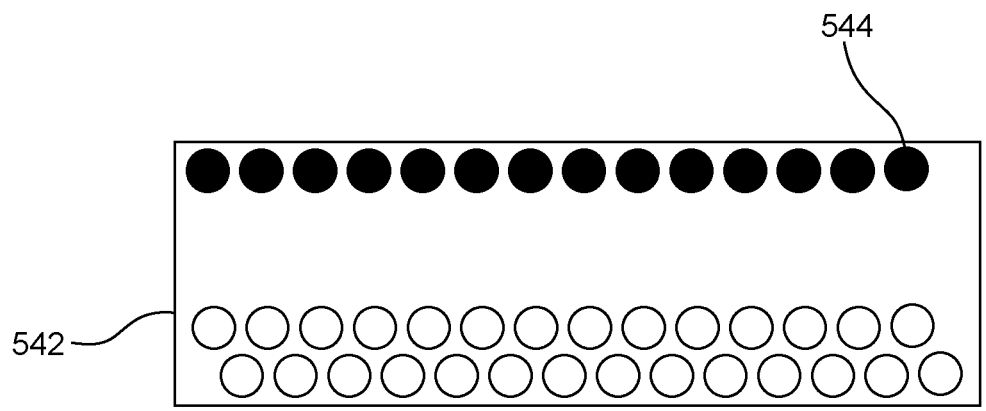
FIGS. 5A-5B are schematic cross-sectional views illustrating another example electrophoretic ink cell of a privacy film in accordance with examples of the present disclosure.
Figure 5B:
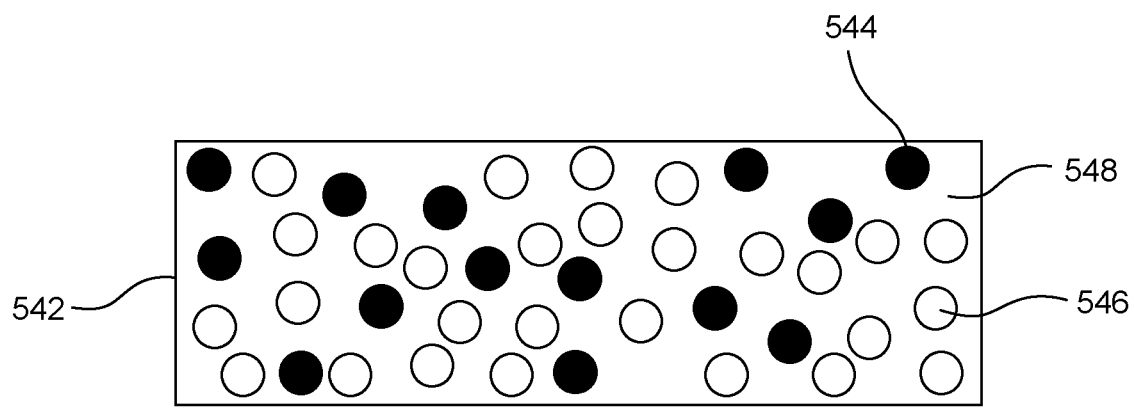

FIGS. 5A and 5B show a cross sectional schematic view of a different example electrophoretic ink cell 542. In FIG. 5A, the cell is in opaque mode with opaque particles 544 in a continuous layer on the viewer side of the cell. Transparent particles 546 are on the rear side of the cell. The rest of the space inside the cell is filled by a solvent 548. This arrangement of opaque and transparent particles can be achieved by applying an appropriate voltage to the electrophoretic ink using electrodes so that the opaque particles are attracted to the viewer side and the transparent particles are attracted to the rear side of the cell.

FIG. 5B shows the electrophoretic ink cell 542 in a transparent mode. In this mode, the opaque particles 544 and transparent particles 546 move away from the sides of the cell to be dispersed throughout the solvent 548. The particles can be dispersed in this way by various voltage changes across the electrodes, such as reversing the voltage for a short period of time to bring the particles away from the walls without moving the particles all the way to the opposite sides of the cell. Other methods can include applying a series of opposite voltages with successively smaller magnitudes until no voltage is applied.

Figure 6A:
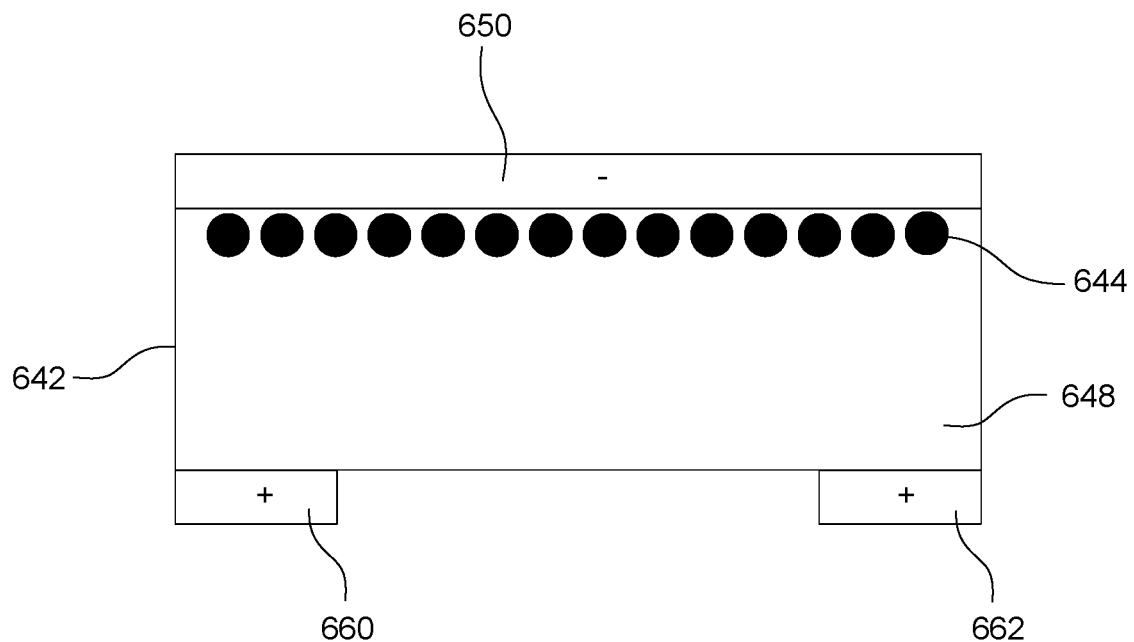
FIGS. 6A-6B are schematic cross-sectional views illustrating yet another example electrophoretic ink cell of a privacy film in accordance with examples of the present disclosure.
Figure 6B:
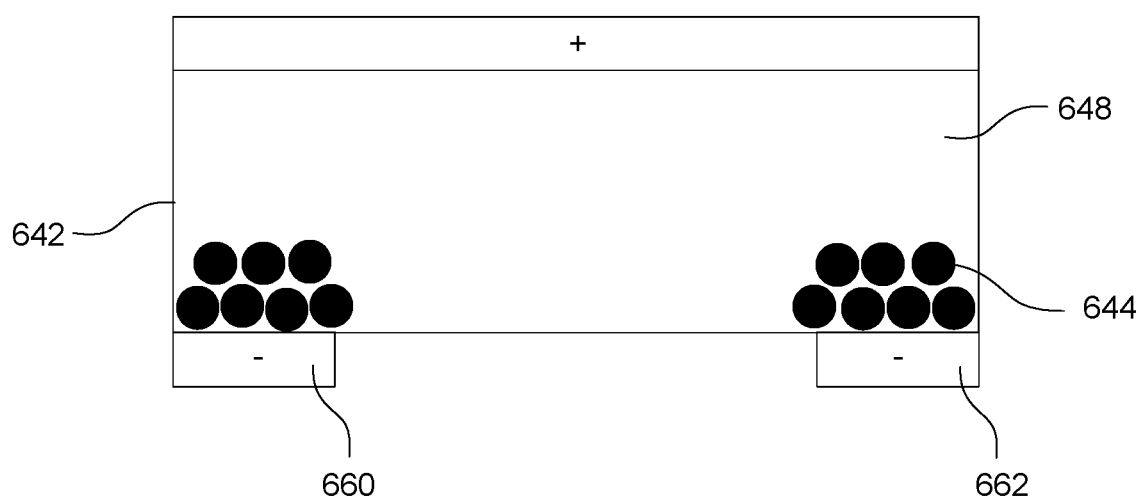

FIGS. 6A and 6B are cross sectional schematic views of another example electrophoretic ink cell 642. In FIG. 6A, the cell is in an opaque mode with a continuous layer of opaque particles 644 on the viewer side of the cell. This example includes the opaque particles in a solvent 648 without any transparent particles. FIG. 6B shows the cell in a transparent mode. The opaque particles are attracted to two small electrodes 660, 662 on the rear side of the cell. This leaves a transparent opening for light to be transmitted through the cell.

The privacy films described herein can use any of the above example configurations of electrophoretic ink cells. However, the electrophoretic ink cells are not limited to these configurations. In other examples, electrophoretic ink can be associated with the low refractive index slats of the louver film in any way that allows the electrophoretic ink to block light in an opaque state and transmit light in a transparent state. As used herein "transparent state" is not limited to 100% transparency, but can include partial transparency as well. In certain examples, the electrophoretic ink in a transparent state can transmit from 30% to 100% of light passing through the electrophoretic ink. Similarly, the "opaque state" is not limited to 100% opaque. In some examples, the electrophoretic ink can block from 70% to 100% of light in the opaque state.

The above examples involve a separate electrophoretic ink layer on the viewer side of the louver film. However, in alternative examples the electrophoretic ink can be incorporated into the louver film itself instead of in a separate layer. In certain examples, the low refractive index slats of the louver film can be spaces filled with electrophoretic ink. As described above, in some examples the electrophoretic ink can include opaque particles in a solvent. In further examples, the electrophoretic ink can include opaque particles and transparent particles. In these examples, the low refractive index slats can operate similarly to the electrophoretic ink cells in the examples above. The electrophoretic ink can switch from an opaque state to a transparent state to block or transmit light through the low refractive index slats.

Figure 7:
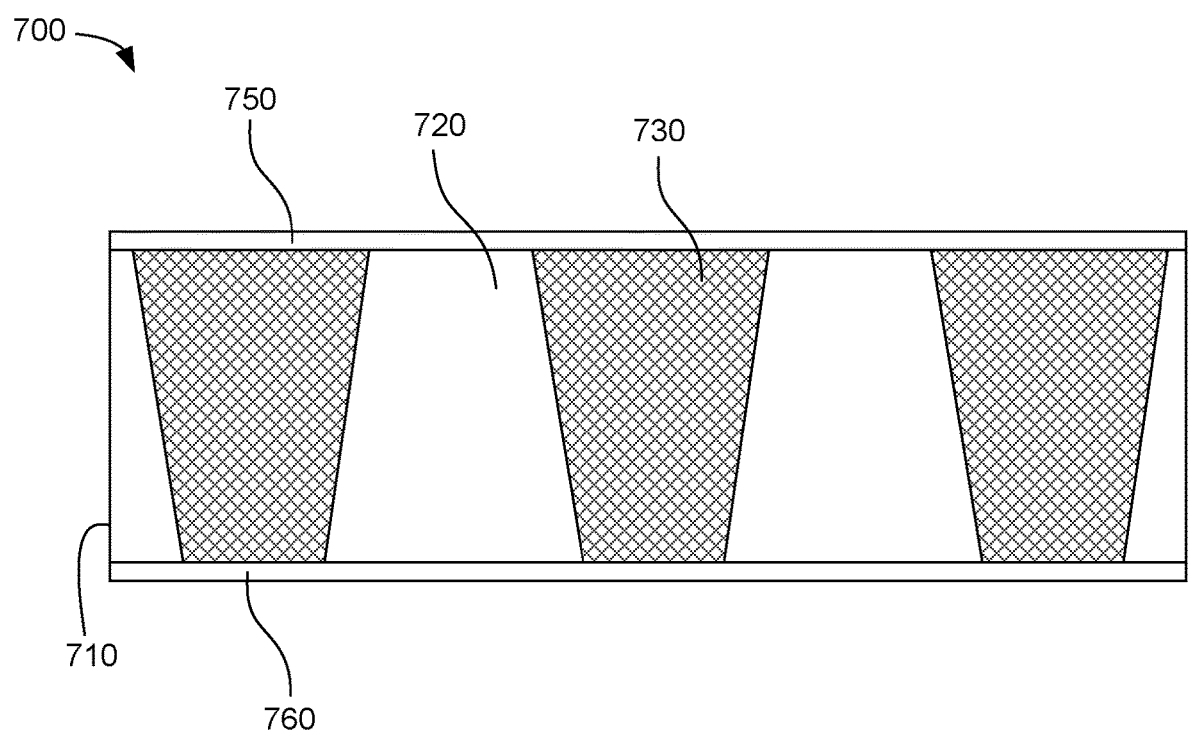
FIG. 7 is a schematic cross-sectional view illustrating another example privacy film in accordance with examples of the present disclosure.

FIG. 7 shows a schematic cross-sectional view of an example privacy film 700 in accordance with the present disclosure. In this example, the privacy film includes a louver film 710 having high refractive index slats 720 and low refractive index slats 730. The low refractive index slats in this example are filled with electrophoretic ink that can switch from an opaque state to a transparent state. A first transparent electrode film 750 is on the viewer side of the louver film and a second transparent electrode film 760 is on the rear side of the louver film. These transparent electrodes can be used to apply an electric field to the electrophoretic ink and move particles in the electrophoretic ink.

Figure 8A:
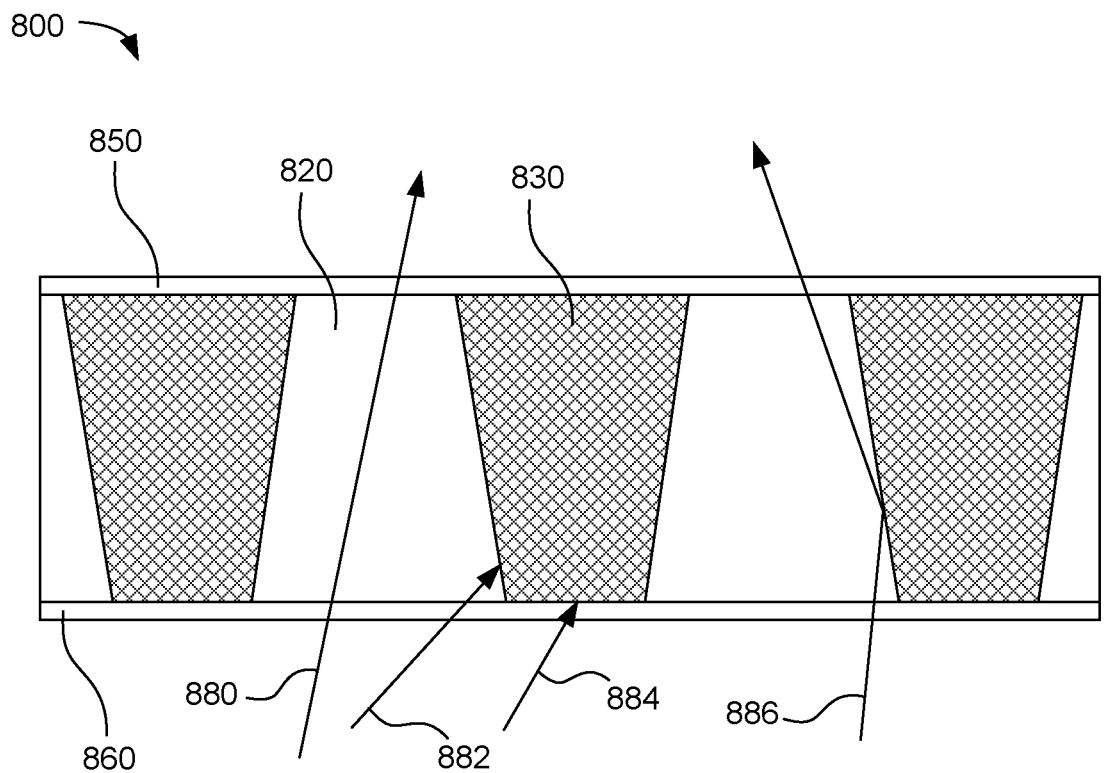
FIGS. 8A-8B are schematic cross-sectional views illustrating yet another example privacy film in accordance with examples of the present disclosure.
Figure 8B:
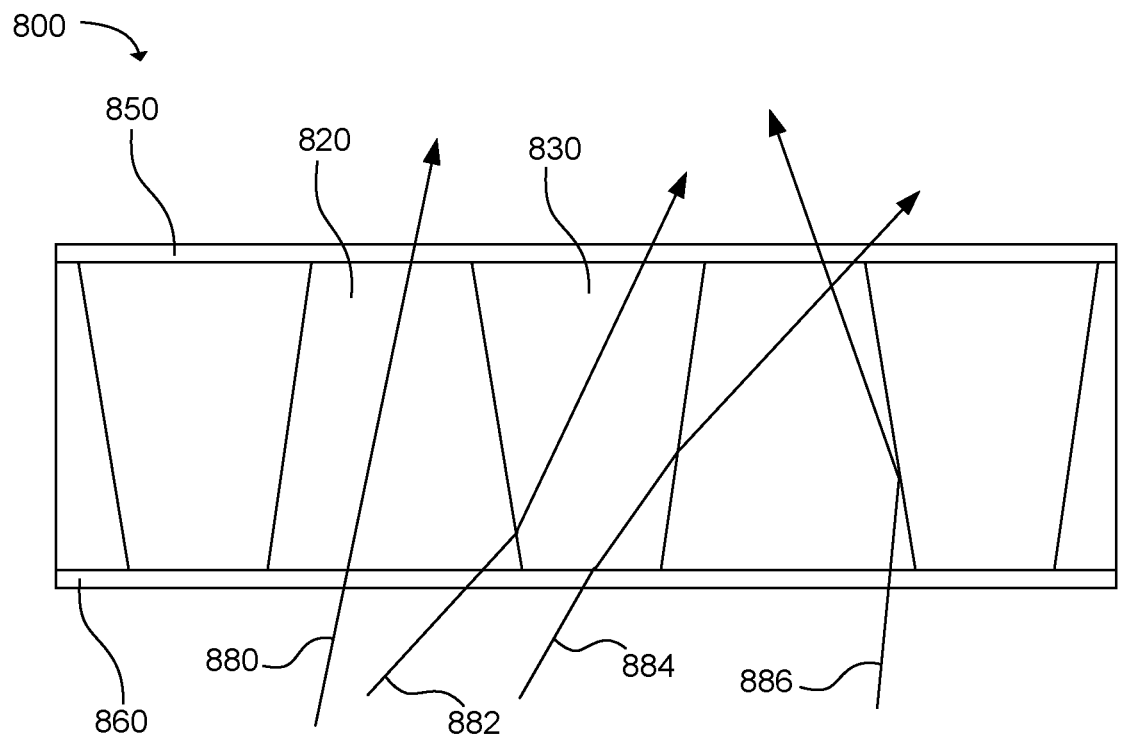

FIGS. 8A and 8B are schematic cross-sectional views of an example privacy film 800, showing how the privacy film can restrict the viewable angle of light transmitted through the film. In FIG. 8A, the privacy film includes a louver film with high refractive index slats 820 and low refractive index slats 830. A first transparent electrode film 850 is on the viewer side of the louver film and a second transparent electrode film 860 is on the rear side of the louver film. A light ray 880 having a narrow angle is shown passing through the transparent electrode films and one of the high refractive index slats. Other light rays with sufficiently narrow angles to pass all the way through a high refractive index slat can similarly be transmitted through the privacy film. Another light ray 882 has a wider angle. This light ray strikes an interface between a high refractive index slat and a low refractive index slat. The angle of incidence is too steep for the light ray to be reflected. Because the low refractive index slat is filled with an opaque electrophoretic ink, the light ray is blocked. A third light ray 884 is blocked at the rear side of the louver film by the opaque low refractive index slat. A fourth light ray 886 strikes an interface between a high refractive index slat and a low refractive index slat. The angle of incidence of this light ray is shallow and the light ray reflects off the interface and out of the privacy film. After reflecting off the interface, the light ray still has a relatively narrow angle. Thus, the privacy film can block wide angle light while allowing narrow angle light to pass through when the electrophoretic ink is in opaque mode.

FIG. 8B shows the privacy film 800 when the electrophoretic ink is in the transparent state. In this example, each of the light rays is able to pass all the way through the privacy film. The wide angle light rays are not blocked but instead are freely transmitted through the film.

Figure 9A:
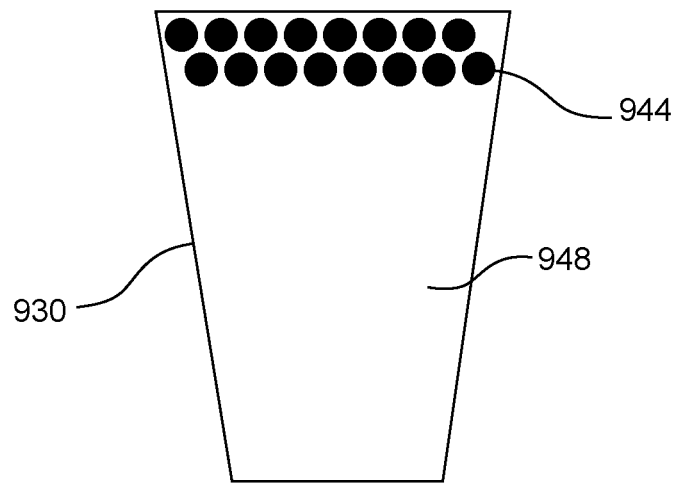
FIGS. 9A-9B are schematic cross-sectional views illustrating an example low refractive index slat containing electrophoretic ink in a privacy film in accordance with examples of the present disclosure.
Figure 9B:
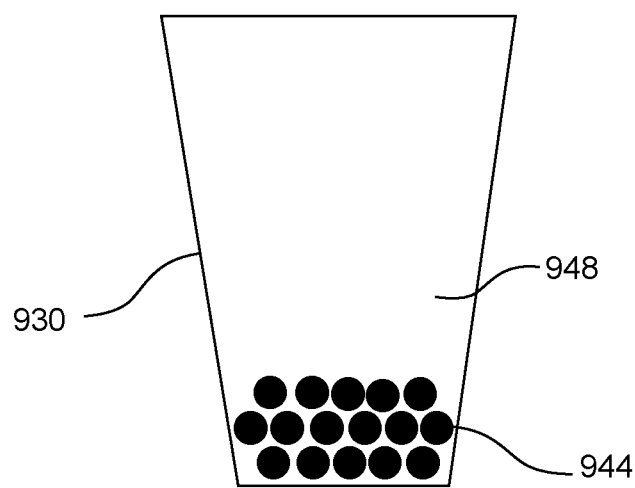

In certain examples, the low refractive index slats containing the electrophoretic can operate similarly to any of the example electrophoretic ink cells described above. Additionally, FIGS. 9A and 9B show another example of a low refractive index slat 930 configured to block light using electrophoretic ink with opaque particles 944. In this example, the electrophoretic ink includes black particles in a solvent 948. In FIG. 9A, the black particles are in a continuous layer at the viewer side of the low refractive index slat. In FIG. 9B, the black particles are in a continuous layer on the rear side of the low refractive index slat. In this state, the black particles can block some light from being transmitted by the privacy film. However, much of the wide angle light can be transmitted because the light rays can pass in front of the opaque particles.

In various examples, the particular viewable angles and amounts of light blocked by the privacy film can vary depending on several factors. For example, the dimensions of the slats in the privacy film, the materials used for the slats, the thickness of the electrophoretic ink layer if the electrophoretic ink is in a separate layer, the properties of the electrophoretic ink, and others. For example, thicker louver films with slats that are closer together can tend to make the viewable angle narrower. The angles of the slats and the materials used to make the slats can also affect the viewable angle. In some examples, the privacy film can provide the brightest viewing in a location that is straight in front of the display. The brightness of the display can then decrease as the viewing angle becomes larger, until finally the display can look black from a particular viewing angle.

Louver Films

As mentioned above, in some examples the louver film can include high refractive index slats and low refractive index slats. The high refractive index slats can be made of a material that has a higher refractive index than the low refractive index slats. In certain examples, the high refractive index slats can be made from a material having a refractive index from about 1.5 to about 3. In further examples, the high refractive index slats can have a refractive index from about 1.5 to about 2.5 or from about 1.5 to about 2. Non-limiting examples of materials that can be used in the high refractive index slats include polyethylene terephthalate (n=1.575), polyethylene (n=1.5), polycarbonate (n=1.6), poly(acrylic acid) (n=1.527), polyvinyl chloride (n=1.539), styrene-polyester copolymers (n varies), epoxy polybutadiene (n varies), UV-curing acrylic glue (n varies), and combinations thereof.

The low refractive index slats can have a lower refractive index than the high refractive index slats. In some examples, the low refractive index slats can have a refractive index that is from about 0.1 to about 2 less than the high refractive index slats. In certain examples, the low refractive index slats can include silicon. In other examples, another material that has a refractive index lower than the refractive index of the high refractive index slats can be used. For example, the polymers mentioned above can be used as the low refractive index material if the high refractive index slats are made of a material having a refractive index from about 0.1 to about 2 higher. Thus, in some examples, the low refractive index slats can include polyethylene terephthalate, polyethylene, polycarbonate, poly(acrylic acid), polyvinyl chloride, styrene-polyester copolymers, epoxy polybutadiene, UV-curing acrylic glue, or combinations thereof.

The dimensions of the high refractive index slats and low refractive index slats can be designed to provide a desired viewable angle in privacy mode. In some examples, the louver film can have a thickness from about 0.1 mm to about 1 mm. In further examples, the louver film can have a thickness from about 0.2 mm to about 0.8 mm or from about 0.4 mm to about 0.6 mm. The high refractive index slats can be trapezoidal in cross section, with the trapezoidal cross section narrowing toward a viewer side of the louver film. The trapezoidal cross section can have an acute angle from about 85° to about 88°. The two bases, or parallel sides, of the trapezoidal cross section can be along the viewer side and the rear side of the louver film. In some examples, the smaller base on the viewer side can have a width from about 10 μm to about 500 μm. In further examples, the smaller base can have a width from about 20 μm to about 400 μm, or from about 30 μm to about 300 μm. In still further examples, the larger base on the rear side can have a width from about 10 μm to about 700 μm. In other examples, the larger base can have a width from about 20 μm to about 500 μm or from about 30 μm to about 300 μm. In some examples, the low refractive index slats can have the same dimensions and angles as the high refractive index slats, but reversed so that the low refractive index slats narrow toward the rear side of the louver film. In other examples, the low refractive index slats can have a larger base on the viewer side with a width from about 10 μm to about 700 μm, and a smaller base on the rear side with a width from about 10 μm to about 500 μm.

In certain examples, the louver film can be made by molding, photoetching, extruding, or by other methods. In one example, the low refractive index slats can be formed by etching a silicon material having an appropriate refractive index. The high refractive index slats can then be made by coating the film with a high refractive index polymer to fill in the spaces between the low refractive index slats. In another example, the louver film can be made using a roll-to-roll process with a micro-patterned roller forming a film with the trapezoidal cross-section shape of either a low refractive index material or a high refractive index material. The complimentary high refractive index or low refractive index material, respectively, can then be added to fill in the spaces between the trapezoidal slats.

Electrophoretic Inks

The electrophoretic ink can include opaque particles that can move in response to an electric field. A variety of different electrophoretic ink compositions can be suitable for use with the privacy films described herein. Many electrophoretic ink compositions include black particles. The black particles usually include a black pigment and additional ingredients to help disperse the black pigment particles and to give the particles an electric charge. In some examples, as described above, the electrophoretic ink used in the privacy films can also include transparent particles. These particles can, in some examples, include similar dispersing ingredients and charging ingredients as the black pigment particles. The transparent particles can include a transparent material instead of a black pigment. In some examples, the transparent material can have a refractive index that is close to (i.e., within about 0.1 of) the refractive index of the solvent in which the particles are dispersed.

In some examples, the opaque particles in the electrophoretic ink can include a black pigment, such as carbon black for example. A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1. In certain examples, the pigment particles can have an average particle size from about 1 nm to about 50 μm. In further examples, the pigment particles can have an average particle size from about 50 nm to about 1 μm, or from about 100 nm to about 500 nm.

In further examples, the pigment particles in the electrophoretic ink can be coated with a polymer. In certain examples, the polymer can be polymerized from monomers such as acrylates, methacrylates, acrylamides, methacrylamides, N,N-dialkylacrylamides, N-vinylpyrrolidone, styrene, trifluoroethyl methacrylate, hexafluorobutyl acrylate, other kinds of fluorinated monomers, such as pentafluorostyrene or other polyfluoroaromatic molecules containing a polymerizable functional group. More specific examples can include methyl methacrylate, ethyl methacrylate, butyl methacrylate, isobutyl methacrylate, t-butyl methacrylate, octyl methacrylate, 2-ethylhexyl methacrylate, 2-hydroxyethyl methacrylate, acrylamide, acrylic acid, acrylonitrile, methyl vinyl ketone, methacrylamide, N-vinylpyrrolidone, styrene, vinyl acetate, vinyl chloride, and vinylidene chloride.

In still further examples, the transparent particles can include any of the above polymers. In certain examples, the transparent particles can simply be particles made of a transparent polymer. In a particular example, the transparent particles can be polycarbonate particles, poly(methyl methacrylate) particles, or combinations thereof. In other examples, the transparent particles can be glass particles.

In further examples, the pigment particles (or polymer particles in the transparent particles) can be dispersed with a dispersing agent. Non-limiting examples of dispersing agents can include the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TECO® 650, TECO® 651, TECO® 655, TECO® 685, and TECO® 1000); and various dispersants manufactured by Sigma-Aldrich, St. Louis, Mo., (e.g., SPAN® 20, SPAN® 60, SPAN® 80, and SPAN® 85).

In other examples, the particles can include coupling agents attached to the particle surface. The coupling agents can include functional groups such as acids and bases for charging the particles. The coupling agents can also include steric stabilizing groups for suspending the particles in the solvent. In certain examples, the coupling agent can be a silane coupling agent, including a silicon atom bonded to an organic group. The silicon atom can also be bonded an alkoxy group, hydroxyl group, or chlorine atom. The silane coupling agent can attach to the surface of a particle by replacing one of the alkoxy group, hydroxyl group, or chlorine atom with an atom of the surface of the particle.

Examples of silane coupling agents having acidic or basic functional groups can include, but are not limited to, aminopropyl triethoxy silane (A1100), triethoxysilylpropylmaleamic acid (TMA), 3-(trihydroxysilyl)-1-propane sulfonic acid (TSA), N-3-[amino(polypropylenoxy)]-aminopropyltrimethoxysilane, N-(hydroxyethyl)-N-methylaminopropyltrimethoxysilane, diethylaminomethyltriethoxysilane, (N,N-diethyl-3-aminopropyl)trimethoxysilane, 2-(4-pyridylethyl)triethoxysilane, N-(3-triethoxysilylpropyl)-4,5-dihydroi midazole, 3-trihydroxysilylpropylmethylphosphonic acid, N-(trimethoxysilylpropyl)ethylenediamine triacetic acid, or the salt forms thereof, such as Ca or Na as counter ions. Examples of silane coupling agents having bulky steric group(s) can include, but are not limited to, n-(trimethoxysilylpropyl)ethylenediamine triacetic acid trisodium (TETAA), n-octadecyl trimethoxysilane (ODTS), dimethyloctadecyl[3-(trimethoxysilyl)propyl]ammonium chloride (DMOTPAC), adamantylethyltrichlorosilane, 2-((bicycloheptyl)trichlorosilane, t-butylisopropyldimethoxysilane, 13-(chlorodimethylsilylmethyl)heptacosane, 11-(cholorodimethylsilylmethyl)tricosane, n-decyltrichlorosilane, n-decyltriethoxysilane, cyclohexylmethyldimethoxysilane, dicyclohexyldichlorosilane, (3,3-dimethylbutyl)dimethylchlorosilane, di-n-octyldichlorosilane, (di-n-octylmethylsilyl)ethyldimethylchlorosilane, (di-n-octylmethylsilyl)ethyltrichlorosilane, docosyltrichlorosilane, eicosyltrichlorosilane, hexadecyltriethoxysilane, isooctyltrimethoxysilane, or n-octyldiisopropylchlorosilane.

In some examples, the electrophoretic ink can also include a charge director. As used herein, the term "charge director" refers to a material that, when used, facilitates charging of the colorant particles. In an example, the particles in the ink can be modified with an acid and the charge director can be basic to react with the acid-modified colorant particle to negatively charge the particle. In other words, the charging of the particle can be accomplished via an acid-base reaction between the charge director and the acid-modified particle surface. The charge director may also be used in the electronic ink to prevent undesirable aggregation of the pigment in the solvent. In other cases, the charge director can be acidic and can react with a base-modified particle to positively charge the particle. Again, the charging of the particle can be accomplished via an acid-base reaction between the charge director and the particle surface. The charge director can be a small molecule or polymer that is capable of forming reverse micelles in a non-polar solvent. Such charge directors are generally colorless and tend to be dispersible or soluble in the solvent.

The particles can be dispersed in a solvent. In some examples, the solvent can be a non-polar solvent. In particular examples, the solvent can include perchloroethylene, cyclohexane, dodecane, mineral oil, isoparaffinic fluids, cyclopentasiloxane, cyclohexasiloxane, or combinations thereof.

In further examples, the concentration of particles in the electrophoretic ink can be from about 1 wt % to about 20 wt % with respect to the total weight of the electrophoretic ink. In certain examples, the electrophoretic ink can include opaque particles and transparent particles. The concentration of opaque particles can be from about 0.5 wt % to about 10 wt % and the concentration of transparent particles can be from 0.5 wt % to 10 wt %. The concentration of transparent particles can be substantially equal to the concentration of opaque particles in some examples. In other examples, the ink can include more transparent particles than opaque particles. In still other examples, the electrophoretic ink can include opaque particles at a concentration of 1 wt % to 20 wt %, but no transparent particles.

As shown in FIG. 1 above, in some examples the electrophoretic ink can be contained in a separate electrophoretic ink layer on the viewer side of the louver film. The electrophoretic ink cells can be positioned over the low refractive index slats to block light from the low refractive index slats. Thus, the electrophoretic ink cells can have the same width as the viewer side of the low refractive index slats. The transparent cells between the electrophoretic ink cells can have the same width as the viewer side of the high refractive index slats. The electrophoretic ink layer can have a thickness from about 10 µm to about 500 µm. In further examples, the electrophoretic ink layer can have a thickness from about 100 µm to about 400 µm or from about 200 µm to about 400 µm.

As shown in the figures, transparent electrode films can be used to move the particles in the electrophoretic ink. Non-limiting examples of suitable materials for the electrode 24 include a metal (such as, e.g., gold, aluminum, nickel, copper, etc.), a conductive oxide (such as, e.g., indium tin oxide, etc.), a conductive polymer (such as, e.g., PEDOT (poly(3,4-ethylenedioxythiophene), and/or the like), a conductive composite (such as, e.g., a layer of carbon nanotubes, etc.), and/or combinations thereof. In some examples, the electrophoretic ink can be contained in a separate electrophoretic ink layer and the transparent electrode films can be positioned in direct contact with the electrophoretic ink layer, one electrode on the viewer side of the layer and the other electrode on the rear side of the layer. In other examples, one of the electrodes can be positioned on a rear side of the louver film. In alternative examples, the electrophoretic ink can be contained within the low refractive index slats of the louver film. In these examples, the electrodes can be located in direct contact with the viewer side of the louver film and the rear side of the louver film. The thickness of the transparent electrode films can be from about 1 µm to about 10 µm, in some examples.

Electronic Displays

Figure 10:
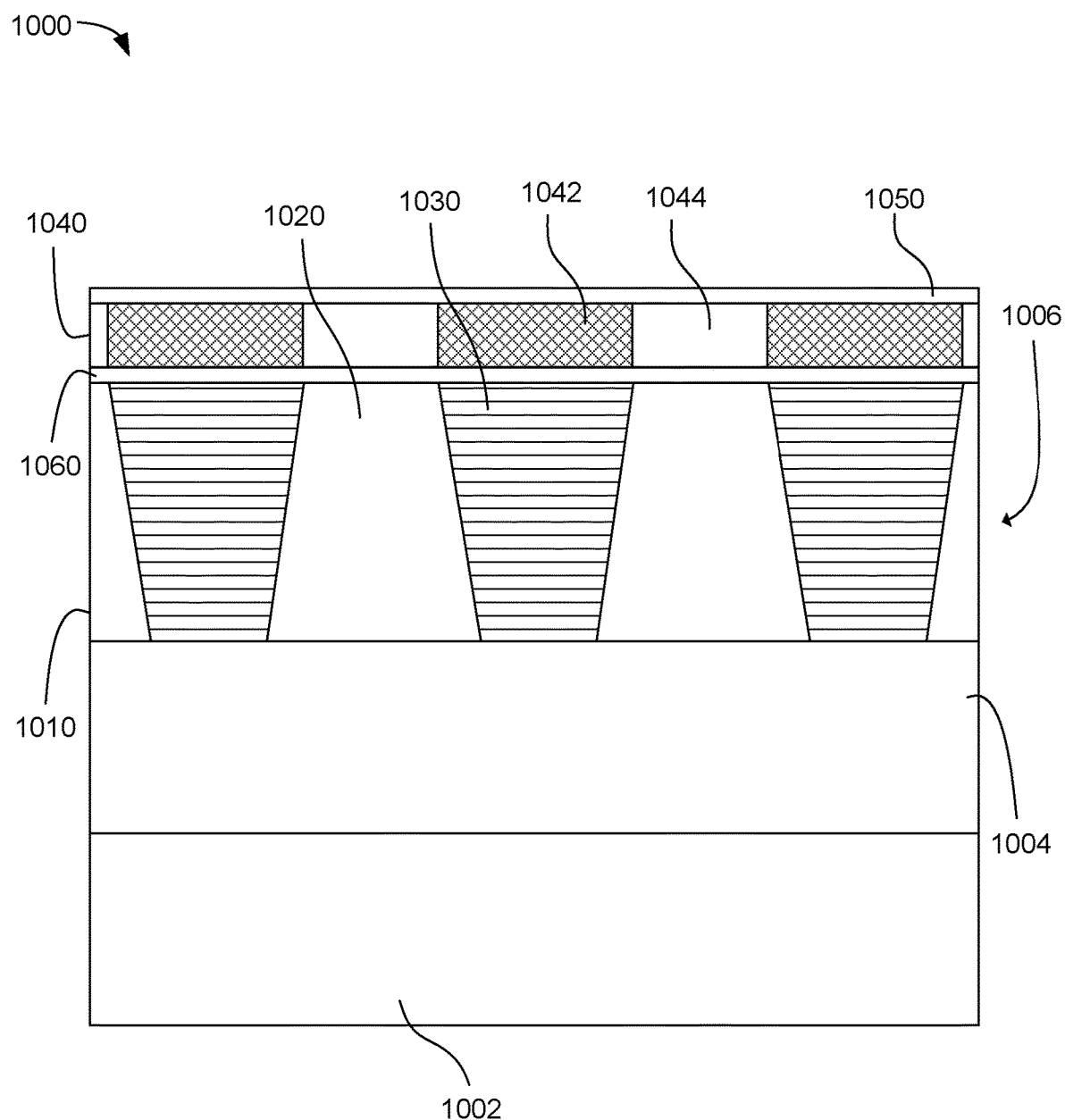
FIG. 10 is a schematic cross-sectional view illustrating an example electronic display in accordance with examples of the present disclosure.

The privacy films described herein can be a removable film that can be applied to an electronic display, or the privacy films can be integrated as a permanent part of an electronic display. FIG. 10 shows a schematic cross-sectional view of an example electronic display 1000 according to the present disclosure. The electronic display includes a backlight unit 1002, a liquid crystal display panel 1004 on a viewer side of the backlight unit, and a privacy film 1006 on a viewer side of the liquid crystal display panel. The privacy film includes a louver film 1010. The louver film includes a plurality of high refractive index slats 1020 having a trapezoidal cross section narrowing toward the viewer side of the louver film. The high refractive index slats can have a refractive index of about 1.5 to about 3. The louver film also includes a plurality of low refractive index slats 1030 between the high refractive index slats. The low refractive index slats can have a refractive index that is less than the refractive index of the high refractive index slats by about 0.1 to about 2. The privacy film also includes an electrophoretic ink layer 1040 with electrophoretic ink cells 1042 and transparent cells 1044. A first transparent electrode film 1050 is on the viewer side of the electrophoretic ink layer and a second transparent electrode film 1060 is on the rear side of the electrophoretic ink layer.

Unlike some other privacy film technologies that use a collimated backlight unit, the present privacy film works with normal un-collimated backlight units. Accordingly, the backlight unit can be any backlight unit found in laptops, tablet computers, smartphones, and so on. Additionally, the liquid crystal display panel can be any type of liquid crystal display panel included in laptops, tablet computers, smartphones, and so on.

Figure 11:
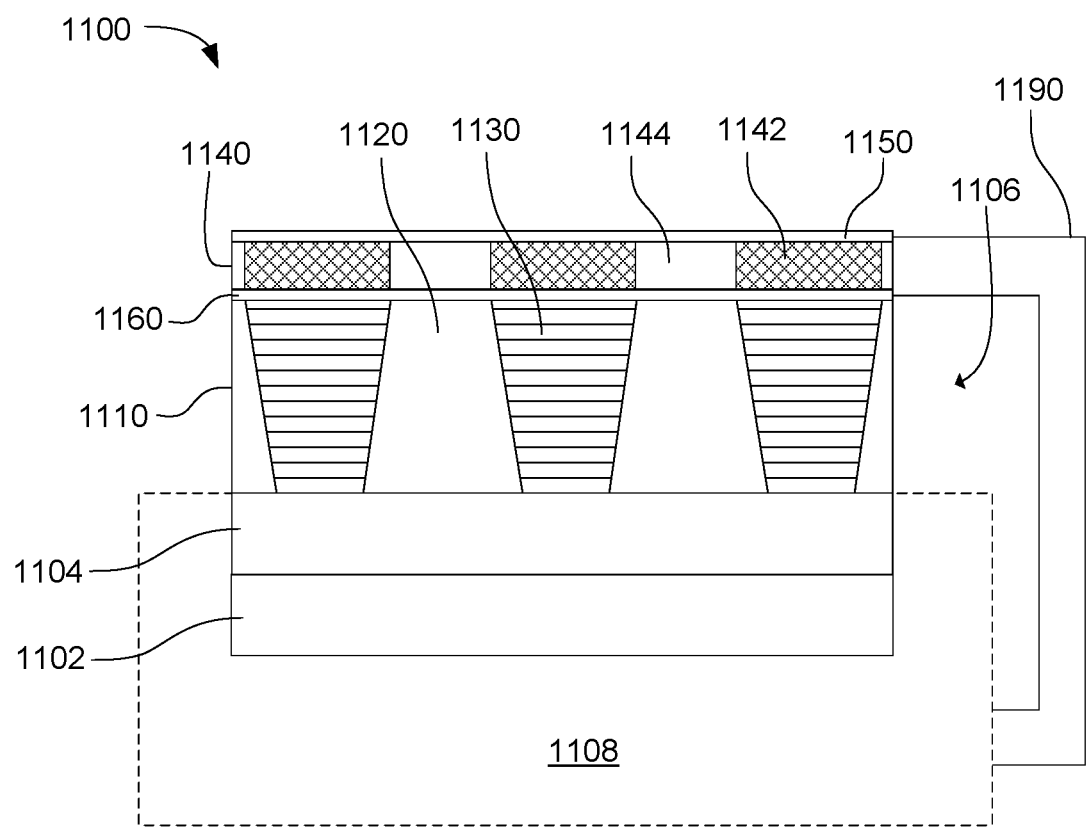
FIG. 11 is a schematic cross-sectional view illustrating an example electronic device in accordance with examples of the present disclosure.

In other examples, the electronic display can be a part of an electronic device. FIG. 11 shows an example electronic device 1100 in accordance with the present disclosure. The electronic device includes a backlight unit 1102, a liquid crystal display panel 1104, and a privacy film 1106. The backlight unit and liquid crystal display are included as parts of electronic components 1108 of the electronic device. As in the examples above, the privacy film includes a louver film 1110. The louver film includes a plurality of high refractive index slats 1120 having a trapezoidal cross section narrowing toward the viewer side of the louver film. The louver film also includes a plurality of low refractive index slats 1130 between the high refractive index slats. The privacy film also includes an electrophoretic ink layer 1140 with electrophoretic ink cells 1142 and transparent cells 1144. A first transparent electrode film 1150 is on the viewer side of the electrophoretic ink layer and a second transparent electrode film 1160 is on the rear side of the electrophoretic ink layer. The electronic device also includes connections 1190 to the transparent electrode films so that the electronic device can switch the privacy film from privacy mode to sharing mode.

When the privacy film is mounted on an electronic display, either removably or permanently, the privacy film can be oriented so that the slats extend in a substantially vertical direction. The slats are designed to restrict the side-to-side viewable angle of the electronic display. However, the slats do not affect the top-to-bottom viewable angle. Thus, the privacy film can be oriented correctly so that a user directly in front of the electronic display can see the information on the display while other onlookers with wider viewing angles will not see the information.

Methods of Making Privacy Films

Figure 12:
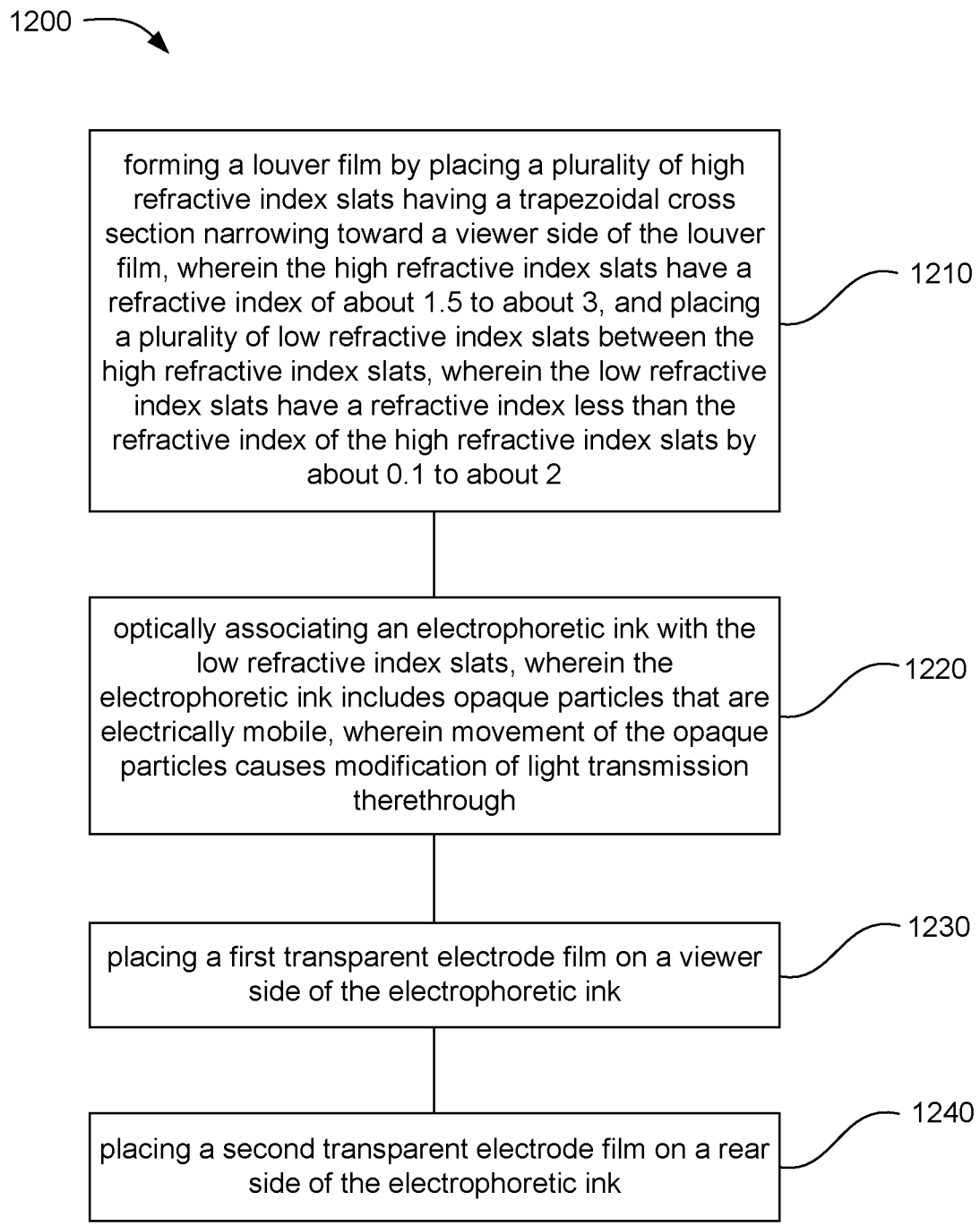
FIG. 12 is a flowchart illustrating an example method of making a privacy film for an electronic display in accordance with examples of the present disclosure.

The present disclosure also extends to methods of making privacy films for electronic displays. FIG. 12 is a flowchart of one example method 1200 of making a privacy film for an electronic display. The method includes: forming 1210 a louver film by placing a plurality of high refractive index slats having a trapezoidal cross section narrowing toward a viewer side of the louver film, wherein the high refractive index slats have a refractive index of about 1.5 to about 3, and placing a plurality of low refractive index slats between the high refractive index slats, wherein the low refractive index slats have a refractive index less than the refractive index of the high refractive index slats by about 0.1 to about 2; optically associating 1220 an electrophoretic ink with the low refractive index slats, wherein the electrophoretic ink includes opaque particles that are electrically mobile, wherein movement of the opaque particles causes modification of light transmission therethrough; placing 1230 a first transparent electrode film on a viewer side of the electrophoretic ink; and placing 1240 a second transparent electrode film on a rear side of the electrophoretic ink. In further examples, the associating of electrophoretic ink with the low refractive index slats can be accomplished by placing the electrophoretic ink within the low refractive index slats or in a separate layer on the viewer side of the low refractive index slats.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein. It is understood that number values such as may be found in in ranged values that include "about" prior to one or both numerical value(s) provides explicit support for sub-ranges that use one or both of the endpoint numerical value(s) that is provided by the range that uses "about" to modify the range endpoints. Likewise, the term "about" modifying a single numerical value also provides specific support for the single numeric value without the term "about" acting as a modifier.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, "refractive index" refers to a ratio of the speed of light in a vacuum to the speed of light in a given material. The speed of light is reduced in various materials compared to the speed of light in a vacuum. Therefore, refractive index values are greater than 1 and typically from about 1 to about 3, depending on the material. Refractive index can be measured using a refractometer such as a RUDOLPH® J457 Refractometer with solid measurement kit from Rudolph Research Analytical.

As used herein, a plurality of items, structural elements, compositional elements, and/or materials may be presented in a common list for convenience. However, these lists are to be construed as though each member of the list is individually identified as a separate and unique member. Thus, no individual member of such list is to be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if each numerical value and sub-range is explicitly recited. For example, a weight ratio range of about 1 wt % to about 20 wt % is to be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the privacy films, electronic displays, and methods described herein, each of these discussions can be considered applicable to each of these examples, whether or not they are explicitly discussed in the context of that example. Thus, for example, in discussing details about the privacy films, such discussion also refers to the methods, and vice versa.

Example

In one example, a privacy film for an electronic display is prepared and applied for use in accordance with the following:

Preparation of a Privacy Film
1) A sheet of polycarbonate having a refractive index of about 1.6 is rolled between heated rollers. One roller has a smooth surface, while the other roller has a micro-patterned surface that forms the polycarbonate into slats having a trapezoidal cross section.
2) A UV-curing acrylic glue having a refractive index from about 1 to about 1.5 is then applied over the patterned side of the polycarbonate to fill in spaces between the slats. The UV-curing acrylic glue is cured to form a solid louver film.
3) A transparent electrode film is formed on the surface of the louver film, where the transparent electrode film is a layer of PEDOT about 10 µm thick.
4) An electronic ink layer is formed over the electrode film by applying another layer of polycarbonate and rolling the film through a micro-patterned roller that forms the polycarbonate into transparent sections positioned over the polycarbonate slats of the louver film.
5) An electrophoretic ink is then placed into the spaces between the transparent polycarbonate sections and a second transparent electrode film is formed over the top of the transparent polycarbonate sections and the electrophoretic ink. The electrophoretic ink includes black pigment particles and transparent polycarbonate particles dispersed in an isoparaffinic solvent.

Use on an Electronic Display
1) The privacy film prepared as described above in this example is placed over an electronic display and a power source is connected to the electrodes to switch the privacy film into privacy mode. The viewable angle in this mode is about 30°.
2) A different voltage is then applied to the electrodes to switch the privacy film into sharing mode. The viewable angle is about 180° in this mode.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A privacy film for an electronic display comprising:
a louver film comprising:
a plurality of high refractive index slats having a trapezoidal cross section narrowing toward a viewer side of the louver film, wherein the high refractive index slats have a refractive index of 1.5 to 3,
a plurality of low refractive index slats between the high refractive index slats, wherein the low refractive index slats have a refractive index less than the refractive index of the high refractive index slats by 0.1 to 2, and
an electrophoretic ink optically associated with the low refractive index slats, wherein the electrophoretic ink includes positively charged opaque particles that are electrically mobile;
a first transparent electrode film on a viewer side of the electrophoretic ink; and
a second transparent electrode film on a rear side of the electrophoretic ink;
wherein movement of the positively charged opaque particles causes modification of light transmission through the electrophoretic ink when a voltage is applied or modified across i) the first transparent electrode film and ii) the second transparent electrode film.

2. The privacy film of claim 1, wherein the positively charged opaque particles in the electrophoretic ink move to permit the light transmission through the electrophoretic ink of light transmitted from the low refractive index slats when the voltage is applied or modified.

3. The privacy film of claim 1, wherein the electrophoretic ink is positioned within the low refractive index slats.

4. The privacy film of claim 1, wherein the electrophoretic ink is positioned as a separate layer on the viewer side of the low refractive index slats.

5. The privacy film of claim 1, wherein the positively charged opaque particles comprise a black pigment.

6. The privacy film of claim 1, wherein the electrophoretic ink further comprises negatively charged transparent particles.

7. The privacy film of claim 6, wherein the negatively charged transparent particles and the positively charged opaque particles rearrange with respect to one another when the voltage is applied or modified across the first and second transparent electrode films.

8. The privacy film of claim 1, wherein the trapezoidal cross section of the high refractive index slats has an acute angle from 85° to 88°.

9. The privacy film of claim 1, wherein the high refractive index slats comprise polyethylene terephthalate, polyethylene, polycarbonate, poly(acrylic acid), or combinations thereof.

10. The privacy film of claim 1, further comprising a power supply connected to the first transparent electrode film and the second transparent electrode film through a switch.

11. An electronic display comprising:
a backlight unit;
a liquid crystal display panel on a viewer side of the backlight unit; and
a privacy film on a viewer side of the liquid crystal display panel, the privacy film comprising:
a louver film comprising:
a plurality of high refractive index slats having a trapezoidal cross section narrowing toward a viewer side of the louver film, wherein the high refractive index slats have a refractive index of 1.5 to 3,
a plurality of low refractive index slats between the high refractive index slats, wherein the low refractive index slats have a refractive index less than the refractive index of the high refractive index slats by 0.1 to 2, and
an electrophoretic ink optically associated with the low refractive index slats, wherein the electrophoretic ink includes positively charged opaque particles that are electrically mobile;

a first transparent electrode film on a viewer side of the electrophoretic ink; and a second transparent electrode film on a rear side of the electrophoretic ink;

wherein movement of the positively charged opaque particles causes modification of light transmission through the electrophoretic ink when a voltage is applied or modified across i) the first transparent electrode film and ii) the second transparent electrode film.

12. The electronic display of claim 11, wherein the privacy film is oriented such that the high refractive index slats and low refractive index slats extend in a vertical direction with respect to a viewer.

13. The electronic display of claim 11, wherein the electronic display is part of an electronic device and the electronic device comprises a connection to the first transparent electrode film and the second transparent electrode film to apply or modify the voltage across the first transparent electrode film and the second transparent electrode film.

14. A method of making a privacy film for an electronic display comprising:

forming a louver film by placing a plurality of high refractive index slats having a trapezoidal cross section narrowing toward a viewer side of the louver film, wherein the high refractive index slats have a refractive index of 1.5 to 3, and placing a plurality of low refractive index slats between the high refractive index slats, wherein the low refractive index slats have a refractive index less than the refractive index of the high refractive index slats by 0.1 to 2;

optically associating an electrophoretic ink with the low refractive index slats, wherein the electrophoretic ink comprises positively charged opaque particles that are electrically mobile;

placing a first transparent electrode film on a viewer side of the electrophoretic ink; and placing a second transparent electrode film on a rear side of the electrophoretic ink;

wherein movement of the positively charged opaque particles causes modification of light transmission through the electrophoretic ink when a voltage is applied or modified across i) the first transparent electrode film and ii) the second transparent electrode film.

15. The method of claim 14, wherein optically associating the electrophoretic ink comprises placing the electrophoretic ink within the low refractive index slats or in a separate layer on the viewer side of the low refractive index slats.

16. The privacy film of claim 6, wherein the positively charged opaque particles comprise a black pigment, and wherein the negatively charged transparent particles comprise a transparent material selected from the group consisting of polycarbonate particles, poly(methyl methacrylate) particles, glass particles, and a combination thereof.

17. The electronic display of claim 11, wherein the positively charged opaque particles comprise a black pigment, and wherein the negatively charged transparent particles comprise a transparent material selected from the group consisting of polycarbonate particles, poly(methyl methacrylate) particles, glass particles, and a combination thereof.

18. The method of claim 14, wherein the positively charged opaque particles comprise a black pigment, and wherein the negatively charged transparent particles comprise a transparent material selected from the group consisting of polycarbonate particles, poly(methyl methacrylate) particles, glass particles, and a combination thereof.

* * * * *